3,259,646
PROCESS FOR THE PREPARATION OF
p-HYDROXYBENZONITRILE
Howard E. Harris, Bloomfield, and Hershel L. Herzog, Wayne Township, Passaic County, N.J., assignors to Schering Corporation, Bloomfield, N.J., a corporation of New Jersey
No Drawing. Filed May 13, 1963, Ser. No. 280,076
6 Claims. (Cl. 260—465)

This invention relates to a process useful in the preparation of certain aromatic nitriles. More particularly, this invention relates to a process useful in the preparation of p-hydroxybenzonitrile.

The preparation of aromatic nitriles by the classical Rosenmund-von-Braun reaction is, of course, well-known. In certain respects however, application of the standard techniques for this reaction has been somewhat limited. For example, in those instances wherein it is desired to introduce a nitrile function into phenol, it has been necessary to either etherify or esterify the free hydroxyl group in order to efficiently effect reaction with cuprous cyanide. This limitation has been particularly true in those instances wherein it has been desired to introduce a nitrile function into a p-halogenophenol. As a matter of fact, there is strong support for the conclusion that it has not been possible to prepare isolatable benzonitriles from such reactants by the standard techniques for effecting the classical Rosenmund-von-Braun reaction.

It is therefore an object of this invention to provide a process wherein certain aromatic nitriles may be obtained in improved-yield quantities, as well as to provide a mechanism which obviates the necessity of esterification or etherification of a phenol. It is also an object of this invention to provide a mechanism wherein p-halogenophenol reactants will respond to the classical Rosenmund-von-Braun process.

These and other objects may be accomplished by causing the desired reactants to undergo a nitrile synthesis while in admixture with certain dipolar solvents.

More particularly, the present invention may be described as residing in the concept of causing p-halogenophenol of the group consisting of p-chlorophenol, p-bromophenol and p-iodophenol to react with cuprous cyanide to form a product possessing an organically bound nitrile group, said reaction taking place while in admixture with a dipolar solvent selected from the group consisting of amides, sulfoxides and sulfones having one of the following structural formulae:

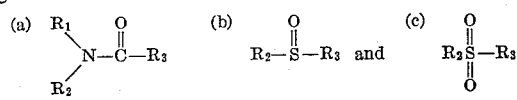

wherein $R_1$ is a member of the group consisting of hydrogen and lower alkyl, and $R_2$ and $R_3$ are lower alkyl, and when taken together, $R_2$ and $R_3$ together with the atom to which they are attached form a 5 to 6 membered heterocycle.

Typical of the solvents falling within the scope of the present invention are, for amides, such solvents as N-methylformamide,
N-ethylformamide,
N-propylformamide,
N-butylformamide,
N-amylformamide,
N,N-dimethylformamide,
N,N-diethylformamide,
N,N-methylethylformamide,
N,N-dipropylformamide,
N,N-propylethylformamide,
N,N-diamylformamide,
N,N-dihexylformamide,
N-methylacetamide,
N-ethylacetamide,
N-propylacetamide,
N-butylacetamide,
N-amylacetamide,
N,N-dimethylacetamide,
N,N-diethylacetamide,
N,N-methylethylacetamide,
N,N-dipropylacetamide,
N,N-propylethylacetamide,
N,N-diamylacetamide,
N,N-dihexylacetamide,
N-methylpropionamide,
N-ethylpropionamide,
N-propylpropionamide,
N-butylpropionamide,
N-amylpropionamide,
N,N-dimethylpropionamide,
N,N-diethylpropionamide,
N,N-methylethylpropionamide,
N,N-dipropylpropionamide,
N,N-propylethylpropionamide,
N,N-diamylpropionamide,
N,N-dihexylpropionamide,
N-methylbutyramide,
N-ethylbutyramide,
N-propylbutyramide,
N-butylbutyramide,
N-amylbutyramide,
N,N-dimethylbutyramide,
N,N-diethylbutyramide,
N,N-methylethylbutyramide,
N,N-dipropylbutyramide,
N,N-propylethylbutyramide,
N,N-diamylbutyramide,
N,N-dihexylbutyramide,
N-methyl-2-pyrrolidone,
N-ethyl-2-pyrrolidone,
N-methyl-2-piperidone,
N-ethyl-2-piperidone, and the like, although in general it is preferred to use those amides wherein $R_1$ is a lower alkyl;

dimethylsulfoxide,
diethylsulfoxide,
dipropylsulfoxide,
dibutylsulfoxide,
diamylsulfoxide,
dihexylsulfoxide,
methylethylsulfoxide,
methylpropylsulfoxide,
methylbutylsulfoxide,
ethylpropylsulfoxide,
tetrahydrothiophenesulfoxide,
dimethylsulfone,
diethylsulfone,
dipropylsulfone,
dibutylsulfone,
diamylsulfone,
dihexylsulfone,
methylethylsulfone,
methylpropylsulfone,
methylbutylsulfone,
ethylpropylsulfone,
tetrahydrothiophenesulfone, and the like.

The choice of solvent is, in part, dependent upon the particular p-halogenophenol reactant. In general, for the p-halogenophenols in which the halogen is of a lower atomic weight, it is preferred to use the higher boiling amides, sulfones or sulfoxides, respectively. For the p-halogenophenol in which the halogen is of a higher atomic weight, it is quite satisfactory to use the lower boiling amides, sulfones or sulfoxides, respectively. Choice of solvent will also depend upon the ready availability and other commercial aspect at any given time.

In effecting the Rosenmund-von-Braun nitrile synthesis reaction according to the teaching of this invention the quantity of solvent employed is generally within the ratio range of about 1:1 to about 5:1 with a preferred range of about 2:1, said ratio being based upon volume (ml.) of solvent/weight (gm.) of p-halogenophenol. The preferred ratio of p-halogenophenol to cuprous cyanide is generally equimolar although excess quantities of either the cuprous cyanide or the p-halogenophenol may be used. The reaction temperature of the mixture is usually within the range of about room temperature to about 250° C., altthough it is generally preferred to cause the reaction to occur at about the reflux temperature of the reaction mixture. The reaction may also be run under elevated pressure when the desired reaction temperature exceeds the boiling point (at atmospheric pressure) of the reaction mixture. The preferred length of reaction time is for about 1 to 8 hours, although the time factor is dependent upon the temperatures and pressures employed, as well as the quantity of reactants used.

The choice of the particular p-halogenophenol for use as a reactant with cuprous cyanide within the concept of the present invention will depend upon the ready availability and other commercial aspects at any given time, but, in general it is preferred to employ p-chlorophenol.

The Rosenmund-von-Braun reaction of the p-halogenophenol with cuprous cyanide while in admixture with a dipolar solvent of this invention results in the formation of an organically bound nitrile. This organically bound nitrile-containing compound, oftentimes stated to be a nitrile-copper halide complex (although the precise composition has never been unequivocally established) may then be reacted upon according to techniques well-known to the art for the formation and isolation of the desired nitrile. In general, the work-up of the p-hydroxybenzonitrile from the initial reaction consists in the removal of the reaction solvent, digestion of the complex in an aqueous mineral acid, and decomposition of the complex by mild oxidation procedures followed by the extraction and purification of the desired product with suitable solvents.

The p-hydroxybenzonitrile obtained by the process of this invention is a commercially available compound useful as an intermediate in the preparation of valuable derivatives. For example, the compound may be phosphorylated to its diethyl phosphate derivative for use as an insecticide, or it may be reacted upon to form its trichloromethanesulfonate derivative for use as a valuable fungicide. The compound may also be converted to other useful derivatives such as polyhalogenated benzonitriles which are capable of influencing plant growth.

The practice and efficacy of the invention is illustrated by the following representative examples.

EXAMPLE 1

*Preparation of p-hydroxybenzonitrile from p-bromophenol using dimethylformamide as a solvent*

A suspension of 34.6 g. (0.2 mole) of p-bromophenol, 21.4 g. (0.24 mole) of cuprous cyanide and 52 ml. of dry dimethylformamide is heated at reflux for 3 to 4 hours. The reaction mixture is vacuum concentrated to near dryness and 20 ml. of water and 20 ml. of concentrated hydrochloric acid are added to the warm viscous residue. The warm mixture is agitated for one-half hour and treated at 85° C. with a solution of 81 g. of hydrated ferric chloride in 100 ml. of water for ¾ of an hour. The solution is cooled to 30° C. and extracted four times with 200 ml. portions of ethyl ether. The combined extracts are backwashed with water and treated with decolorizing carbon, filtered and concentrated to near dryness. The residue is taken up in methylene chloride and concentrated repeatedly, and finally to a volume 30 ml.; the resulting crystal slurry is cooled, filtered and washed with cold methylene chloride. The dry product, 19.2 g., has the following physical and chemical constants: M.P. 109–112°, $$\lambda_{max.}^{MeOH} 248 \ m\mu$$

EXAMPLE 2

*Preparation of p-hydroxybenzonitrile from p-bromophenol using dimethylsulfoxide as a solvent*

A suspension of 34.6 g. of p-bromophenol, 21.4 g. of cuprous cyanide and 140 ml. of dimethylsulfoxide is heated at reflux for 3 hours and then cooled to 50° C. Add a solution of 20 ml. of water and 20 ml. of concentrated hydrochloric acid and warm the resulting mixture for 45 minutes. Add 81 g. of hydrated ferric chloride in 150 ml. of water to the slurry and heat the mixture at 90° C. for one hour. Cool the solution and extract with ethylether several times. Wash the ether extracts with water and concentrate the ether extracts to a dry residue. Recrystallize the residue from toluene-methylene chloride to yield 16 g. of p-hydroxybenzonitrile.

EXAMPLE 3

*Preparation of p-hydroxybenzonitrile from p-bromophenol using dimethylsulfone as a solvent*

A mixture of 34.6 g. of p-bromophenol, 22 g. of cuprous cyanide and 45 g. of dimethylsulfone are heated at reflux for 2 hours. Cool the mixture to about 100° C., add 40 ml. of water and 40 ml. concentrated hydrochloric acid and digest the resulting slurry for about one hour at 90° C. Add a solution of 81 g. of ferric chloride and 100 ml. of water and heat the resulting mixture at 90° C. for one hour. This solution is extracted several times with ethylether and the ether layer washed with water to remove dimethylsulfone. The ether extracts are concentrated to a residue and the residue recrystallized from toluene-methylene chloride to yield about 17 g. of p-hydroxybenzonitrile.

EXAMPLE 4

*Preparation of p-hydroxybenzonitrile from p-iodophenol using dimethylformamide as a solvent*

A suspension of 44 g. of p-iodophenol, 22 g. of cuprous cyanide and 150 ml. of dimethylformamide is heated at reflux for 3 hours. Concentrate the reaction mixture to dryness and add a solution of 120 ml. of water and 50 ml. of concentrated hydrochloric acid and stir the resulting mixture at 90° C. for one hour. To the stirred mixture add 33 g. of hydrated ferric chloride dissolved in 100 ml. of water and heat the mixture for 45 minutes. The product is isolated by extracting with ethylether, and concentrating the ether extract to dryness. The residue is recrystallized from toluene-methylene chloride to yield p-hydroxybenzonitrile.

EXAMPLE 5

*Preparation of p-hydroxybenzonitrile from p-iodophenol using dimethylsulfoxide as a solvent*

A suspension of 44 g. of p-iodophenol, 22 g. of cuprous cyanide and 125 ml. dimethylsulfoxide is heated at reflux for 2 to 3 hours. Concentrate the reaction mixture to near dryness and add a solution of 150 ml. of water and 50 ml. of concentrated hydrochloric acid. Heat the resulting suspension at 85 to 90° C. for one hour, followed by the addition of 33 g. of hydrated ferric chloride dissolved in 100 ml. of water. Heat the resulting mixture (with rapid agitation) for 45 minutes at 90° C. Cool, and extract with ethylether or methylene chloride to isolate the crude product residue. Recrystallize the residue from toluene-methylene chloride to yield about 17 g. of p-hydroxybenzonitrile.

EXAMPLE 6

*Preparation of p-hydroxybenzonitrile from p-iodophenol using dimethylsulfone as a solvent*

A mixture of 44 g. of p-iodophenol, 22 g. of cuprous cyanide and 60 g. of dimethylsulfone is heated at reflux for 2 hours. The mixture is cooled to about 100° C. and a solution of 150 ml. of water and 50 ml. of concentrated hydrochloric acid is added. The resulting mixture is heated with agitation for 45 minutes and 33 g. of hydrated ferric chloride dissolved in 100 ml. of water is added. The resulting mixture is heated for 45 minutes at 90° C. This solution is cooled and extracted several times with ethylether. The ether extracts are washed with water and concentrated to dryness. This residue is recrystallized from toluene-methylene chloride to give p-hydroxybenzonitrile.

EXAMPLE 7

*Preparation of p-hydroxybenzonitrile from p-chlorophenol using N,N-diethylacetamide as a solvent*

A suspension of 64.4 g. of p-chlorophenol, 61.6 g. of cuprous cyanide and 250 cc. of N,N-diethylacetamide is heated to reflux for eight hours. The reaction mixture is concentrated to an oily residue and 60 ml. of concentrated hydrochloric acid and 75 ml. of water are added to the residue. The resulting mixture is heated at 90° C. for one hour. A solution of 200 g. of hydrated ferric chloride in 300 ml. of water is added to the reaction mixture, and the resulting mixture is heated at 85 to 90° C. for 45 minutes. The solution is cooled and extracted with four 400 ml. portions of ethylether. The combined extracts are washed with water, treated with decolorizing carbon, filtered, and concentrated to near dryness. This residue is stirred with hot toluene, cooled and the resulting crystal slurry filtered off to yield about 30 g. of p-hydroxybenzonitrile.

EXAMPLE 8

*Preparation of p-hydroxybenzonitrile from p-chlorophenol using dimethylsulfoxide as a solvent*

A mixture of 12.8 g. of p-chlorophenol, 9.0 g. of cuprous cyanide and 50 ml. of dimethylsulfoxide is slowly heated to reflux. This temperature is maintained for 5 hours and the solution is cooled and poured into a solution of 20 ml. of concentrated hydrochloric acid, 16.5 g. hydrated ferric chloride and 50 ml. of water. This mixture is heated at 90° C. for 30 minutes and then aged at room temperature for 12 hours. The p-hydroxybenzonitrile is isolated by extraction with ethylether, concentrating the ether extracts to a residue, and recrystallizing the residue from toluene-methylene chloride.

EXAMPLE 9

*Preparation of p-hydroxybenzonitrile from p-chlorophenol using tetrahydrothiophene-1,1-dioxide as a solvent*

A mixture of 20 g. of p-chlorophenol, 20 g. of cuprous cyanide and 40 ml. of tetrahydrothiophene-1,1-dioxide is heated at reflux for 5 hours. The mixture is cooled and 16 ml. of concentrated hydrochloric acid and 16 ml. of water are added. This mixture is warmed at 90° C. for 30 minutes and then heated with 64 g. of ferric chloride dissolved in 100 ml. of water for 45 minutes at 90° C. The mixture is cooled and extracted with ethylether several times. The extracts are washed with water and concentrated to dryness. The resulting residue is recrystallized from methylene chloride-toluene to give p-hydroxybenzonitrile.

EXAMPLE 10

*Preparation of p-hydroxybenzonitrile from p-chlorophenol using N-methyl-2-pyrrolidone as a solvent*

A suspension of 32.2 g. (0.25 mole) of p-chlorophenol, 31.3 g. (0.35 mole) of cuprous cyanide and 100 ml. of dry N-methylpyrrolidone is heated at reflux for 6 hours. The reaction mixture is concentrated to near dryness. 25 ml. of concentrated hydrochloric acid and 25 ml. of water are added to the viscous residue, and the warm mixture is agitated for one-half hour. A solution of 100 g. of hydrated ferric chloride in 150 ml. of water is added to the reaction mixture and it is heated at 85° C. for 45 minutes. The solution is cooled and extracted with four 200 ml. portions of ethyl ether. The combined extracts are backwashed, treated with decolorizing carbon, filtered and concentrated to near dryness. The residue is taken up in methylene chloride and concentrated several times, finally to 25 ml., cooled and the crystals are filtered off to yield 14.6 g. of p-hydroxybenzonitrile.

By substituting for the dimethylformamide, dimethylsulfoxide, dimethylsulfone, dimethylformamide, dimethylsulfoxide, dimethylsulfone, N,N-diethylacetamide, dimethylsulfoxide, tetrahydrothiophene-1,1-dioxide and N-methylpyrrolidone of Examples 1–10, respectively, with equivalent quantities of N-methylformamide,
N-ethylformamide,
N-propylformamide,
N-butylformamide,
N-amylformamide,
N,N-diethylformamide,
N,N-methylethylformamide,
N,N-dipropylformamide,
N,N-propylethylformamide,
N,N-diamylformamide,
N,N-dihexylformamide,
N-methylacetamide,
N-ethylacetamide,
N-propylacetamide,
N-butylacetamide,
N-amylacetamide,
N,N-dimethylacetamide,
N,N-methylethylacetamide,
N,N-dipropylacetamide,
N,N-propylethylacetamide,
N,N-diamylacetamide,
N,N-dihexylacetamide,
N-methylpropionamide,
N-ethylpropionamide,
N-propylpropionamide,
N-butylpropionamide,
N-amylpropionamide,
N,N-dimethylpropionamide,
N,N-diethylpropionamide,
N,N-methylethylpropionamide,
N,N-dipropylpropionamide,
N,N-propylethylpropionamide,
N,N-diamylpropionamide,
N,N-dihexylpropionamide,
N-methylbutyramide,
N-ethylbutyramide,
N-propylbutyramide,
N-butylbutyramide,
N-amylbutyramide,
N,N-dimethylbutyramide,
N,N-diethylbutyramide,
N,N-methylethylbutyramide,
N,N-dipropylbutyramide,
N,N-propylethylbutyramide,
N,N-diamylbutyramide,
N,N-dihexylbutyramide,
N-ethyl-2-pyrrolidone,
N-methyl-2-piperidone,
N-ethyl-2-piperidone, and the like;
diethylsulfoxide,
dipropylsulfoxide,
dibutylsulfoxide,
diamylsulfoxide,
dihexylsulfoxide,
methylethylsulfoxide,
methylpropylsulfoxide,
methylbutylsulfoxide,
ethylpropylsulfoxide,
diethylsulfone,
dipropylsulfone,
dibutylsulfone,
diamylsulfone, dihexylsulfone,
methylethylsulfone,
methylpropylsulfone,
methylbutylsulfone,
ethylpropylsulfone,
tetrahydrothiophenesulfone, and the like and by following substantially the same procedures outlined in each example, respectively, there will be produced p-hydroxybenzonitrile.

It is also contemplated that the ortho and the meta position isomers of the instant p-halogenophenol reactants are the equivalents thereto and, as such, are also fully embraced within the concepts of this invention.

While certain representative embodiments and details have been shown for the purpose of illustrating the invention, it will be apparent to those skilled in this art that various modifications may be made therein without departing from the scope of this invention.

We claim:

1. In a process for the manufacture of p-hydroxybenzonitrile the steps which comprise admixing cuprous cyanide and p-halogenophenol, wherein the halogen atom of the p-halogenophenol reactant has an atomic weight greater than 19, in a solvent selected from the group consisting of compounds of the following structural formulae:

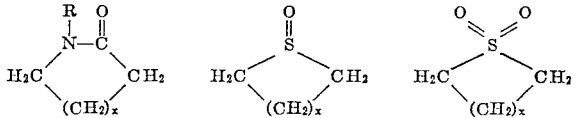

wherein R is a member of the group consisting of hydrogen and lower alkyl and $x$ is a number from 1 to 3, and heating the mixture within the temperature range of substantially above room temperature to about 250° C. until an organically bound nitrile group is formed.

2. In a process for the manufacture of p-hydroxybenzonitrile, the steps which comprise admixing cuprous cyanide and a p-halogenophenol, wherein the halogen atom of the p-halogenophenol reactant has an atomic weight greater than 19, in a solvent selected from the group consisting of compounds of the following structural formulae:

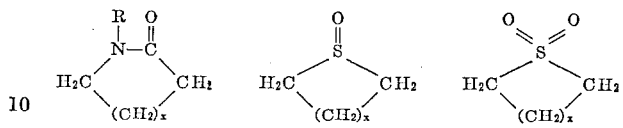

wherein R is lower alkyl and $x$ is a number from 1 to 3, and heating the mixture within the temperature range of substantially above room temperature to about 250° C. until an organically bound nitrile group is formed.

3. The process of claim 1 wherein the p-halogenophenol is p-chlorophenol.

4. The process of claim 1 wherein the p-halogenophenol is p-bromophenol.

5. The process of claim 3 wherein the solvent is N-methyl-2-pyrrolidone.

6. The process of claim 3 wherein the solvent is tetrahydrothiophene-1,1-dioxide.

References Cited by the Examiner
UNITED STATES PATENTS

| | | | |
|---|---|---|---|
| 2,195,076 | 3/1940 | Braun et al. | 260—465 |
| 2,783,265 | 2/1957 | Terpstra | 260—465 |

FOREIGN PATENTS

| | | |
|---|---|---|
| 607,798 | 11/1960 | Canada. |
| 861,898 | 7/1959 | Great Britain. |

CHARLES B. PARKER, *Primary Examiner.*

D. R. MAHANAND, *Assistant Examiner.*